United States Patent [19]

Hideaki et al.

[11] 4,018,516
[45] Apr. 19, 1977

[54] SPECTACLE FRAME

[76] Inventors: Tohyama Hideaki, 4-20-7 Nakaochiai, Shinjuku, Tokyo; Gotoh Bonpei, 1-25-3 Honkomagome, Bunkyo, Tokyo, both of Japan

[22] Filed: Oct. 24, 1975

[21] Appl. No.: 625,471

[30] Foreign Application Priority Data

June 10, 1975 Japan ............... 50-77593[U]

[52] U.S. Cl. ............... 351/121; 351/120; 351/153
[51] Int. Cl.² ............... G02C 5/14
[58] Field of Search .......... 351/121, 120, 153, 157; 16/128 A, 157

[56] References Cited

UNITED STATES PATENTS

| 1,437,557 | 12/1922 | Searles | 351/121 |
| 2,060,727 | 11/1936 | Diodati | 16/128 A |
| 2,507,759 | 5/1950 | Dath | 16/157 |
| 3,846,018 | 11/1974 | Gerson | 351/153 |
| 3,941,461 | 3/1976 | Lambert | 351/153 |

FOREIGN PATENTS OR APPLICATIONS 1,255,951  12/1967  Germany ............... 351/120

*Primary Examiner*—Harold A. Dixon
*Attorney, Agent, or Firm*—Woodling, Krost, Granger & Rust

[57] ABSTRACT

A spectacle frame comprising the main or lens receiving body, two temples and an articulate connecting device for pivotally connecting between each end of said main body and one end of each of said temples, said articulate connecting device comprising one half portion associated with said main body and the other half portion associated with said temple, said one half portion including parts embedded in the main body and pivot support means and said other half portion including a washer member received and held in a recess formed in said temple and an adjustable holding-down member having a recess receiving said pivot support means and adjustably secured to said washer member.

2 Claims, 5 Drawing Figures

U.S. Patent April 19, 1977 4,018,516
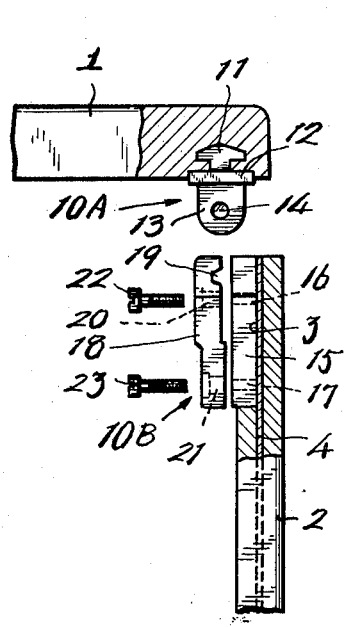
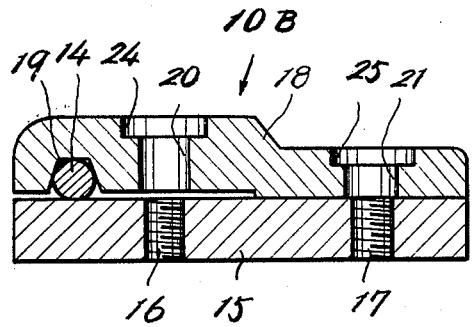
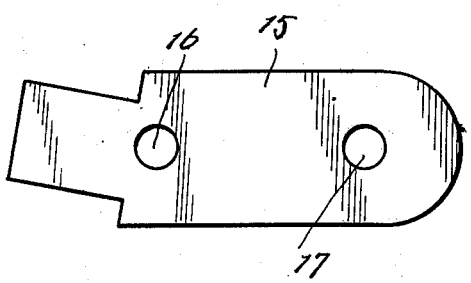
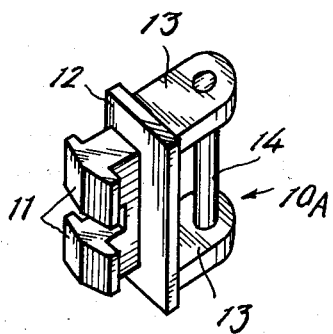
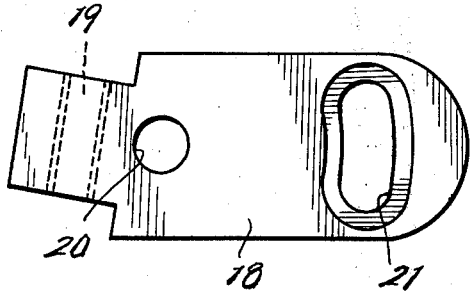

SPECTACLE FRAME

BACKGROUND OF THE INVENTION

This invention relates to a spectacle frame and more particularly, to an articulate connecting device for pivotally connecting between each end of the main or lens receiving body and one end of each of the temples in the spectacle frame.

As well known in the art, most of the prior art spectacle frames use a hinge type connecting device for pivotally connecting between each end of the main or lens receiving body and one end of each of the temples. However, the glasses are usually frequently worn and removed in a day and each time the glasses are worn or removed, the temples are pivoted in one or the other direction relative to the main or lens receiving body about the screw in the connection between the two half portions of the hinge which are secured to the lens receiving body and each of the temples, respectively. Therefore, after repeated wearing and removing of the glasses, the connection inevitably becomes loose and each time the connection becomes loose, the screw is required to be retightened and the retightening of the screw ultimately causes the screw to wear away resulting in irretrievable loosening of the connection. The spectacle frame having such a loosened connection can be no more suitably or comfortably worn by the wearer and there is the possibility that the temple will inadvertently come out of the lens receiving body.

SUMMARY OF THE INVENTION

Therefore, one object of the present invention is to provide a novel and improved spectacle frame which can effectively eliminate the disadvantages inherent in the prior art spectacle frames.

Another object of the present invention is to provide a novel and improved articulate connecting device for pivotally connecting between each end of the main or lens receiving body and one end of each of the temples in a spectacle frame.

A further object of the present invention is to provide a novel and improved articulate connecting device of the above type which includes adjustable means by which the position of each of the temples relative to the lens receiving body can be adjustably varied within a certain angle range in vertical direction.

The above and other objects and attendant advantages of the present invention will be more readily apparent to those skilled in the art from a reading of the following detailed description in conjunction with the accompanying drawing which shows one preferred embodiment of the invention for illustration purpose only, but not for limiting the scope of the same in any way.

BRIEF DESCRIPTION OF THE DRAWING

FIG. 1 is a fragmentary exploded plan view in partial section on an enlarged scale of one preferred embodiment of spectacle frame showing the connection arrangement between one end of the main or lens receiving body and one of the temples of the spectacle frame provided by the use of the articulate connecting device of the invention;

FIG. 2 is a longitudinally sectional view on a further enlarged scale of one half portion of said articulate connecting device associated with the temple showing the half portion in its fastened relationship to the temple;

FIG. 3 is a plan view of the washer member of the half portion of said articulate connecting device as shown in FIG. 2;

FIG. 4 is a plan view of the washer holding-down member of said half portion of the articulate connecting device as shown in FIG. 2; and FIG. 5 is a perspective view on an enlarged scale of the other half portion of the articulate connecting device as shown in FIG. 1.

PREFERRED EMBODIMENT OF THE INVENTION

The present invention will be now described referring to the accompanying drawing which shows the articulate connecting device of the present invention as being employed for pivotally connecting between one end of the main or lens receiving body 1 and one end of one of the temples 2 of a spectacle frame to allow the temple to pivotally move relative to the lens receiving body. However, it will be understood that a similar articulate connecting device is also employed for connecting between the other end of the lens receiving body and the adjacent end of the other temple in the same spectacle frame. The articulate connecting device generally comprises two half portions, that is, the first half portion 10A which is associated with the lens receiving body 1 of the spectacle frame and the second half portion 10B which is associated with the temple 2.

The first half portion 10A of the articulate connecting device will be first described referring to FIGS. 1 and 5 in combination. The first half portion 10A includes a pair of identical spaced legs 11, 11 having an arrow cross-section, a base plate 12 from one side of which the legs 11 extend at right angles thereto, a pair of identical spaced arms or brackets 13, 13 extending from the other side of the base plate 12 at right angles thereto and a pivot pin 14 extending between and secured at the opposite ends to the arms or brackets 13. The legs 11, base plate 12 and arms or brackets 13 may be integrally formed and the first half portion 10A may be secured to the main or lens receiving body 1 of the spectacle frame when the lens receiving body is formed with the legs 11 and base plate 12 being entirely and partially embedded in the material of the lens receiving body 1, respectively. With the first half portion 10A of the articulate connecting device secured to the lens receiving body 1 in the manner mentioned hereinabove, the arms or brackets 13 and pivot pin 14 project out of the inner side of the lens receiving body 1.

Referring now to FIGS. 1, 2, 3 and 4 which shows in combination the second half portion 10B of the articulate connecting device and the second half portion includes a washer member 15 received in a recess 3 formed in the inner surface of the temple 2 which has a reinforcing core metal 4 embedded therein with the inner surface of the washer member projecting out of the inner surface of the temple 2 and having a pair of spaced rivet receiving threaded through holes 16 and 17, a washer holding-down member 18 having a trapezoidal-chaped recess 19 in one or the inner surface for receiving the pivot pin 14 and a pair of screw receiving plain holes 20 and 21. The plain hole 20 is in coaxial alignment with the threaded hole 16 in the washer member 15, but has a diameter greater than that of the hole 16 for the purpose to be described hereinafter. Similarly, the plain hole 21 is in coaxial alignment and communication with the threaded hole 17 in the washer member 15, but has substantially ellipsoidal shape as seen in plan for the purpose to be described hereinafter. The hole 21 extends transversely of the holding-down member 18 with the longitudinal axis of the hole extending at right angles to the longitudinal axis of the washer holding down member. The diameter of the countersink 24 is greater than that of the head of the screw 22 for the purpose to be described hereinafter. Screws 22 and 23 extend through the aligned holes 20, 16 and the aligned holes 21, 17, respectively, to secure the washer holding-down member 18 to the washer member 15 with the pivot pin 14 embraced between the washer member 15 and the washer holding-down member 18 in the position of the recess 19 of the holding-down member whereby the temple 2 can be connected to the end of the lens receiving body 1 in the spectacle frame for pivotal movement to the latter. According to the present invention, as more clearly shown in FIG. 2, the washer holding-down member 18 is further provided with a first countersink 24 in coaxial alignment and communication with the plain hole 20 for receiving the head of the screw 22. The aligned hole 20 and countersink 24 have diameters greater than those of the shank and head of the screw 22, respectively, for the purpose to be described hereinafter. Further provided in the washer holding-down member 18 is a transverse ellipsoidal second countersink 25 which is in coaxial alignment and communication with the hole 21 with the longitudinal axis of the countersink 25 extending at right angles to the longitudinal axis of the washer holding-down member 18 for receiving the head of the screw 23. The distance between the opposite longer sides of the transverse ellipsoidal countersink 25 is just sufficient to receive the head of the screw 23 whereas the distance between the opposite shorter ends of the countersink is substantially greater than the diameter of the head of the screw 23 for the purpose to be described hereinafter.

With the above construction and arrangement of the parts of the spectacle frame of the invention, the spectacle frame of the invention can effectively eliminate the disadvantage inherent in the conventional spectacle frame having the hinge-type connecting device as mentioned hereinabove. That is, in the conventional spectacle frame the screw connects between the two half portions of the hinge which are secured to one end of the main or lens receiving body and to the adjacent end of the temple, respectively, for allowing the temple to pivotally move relative to the lens receiving body and in consequence, the pivotal connection between the two parts of the spectacle frame becomes loose as the screw wears away as the result of repeated wearing and removal of the spectacle frame which leads to undue pivotal movement of the temple relative to the lens receiving body.

As mentioned hereinabove, since the diameters of the plain hole 20 and countersink 24 in the washer holding-down member 18 are greater than those of the shank and head of the screw 22, respectively and the diameter of the ellipsoidal plain hole 21 and the dimension of the countersink 25 (as seen in the transverse direction of the holding-down member 18) are greater than the diameters of the shank and head of the screw 23, respectively, the position of the temple 2 relative to the lens receiving body 1 can be adjustably varied within a certain angular range in vertical direction in conformity with a particular face configuration of a wearer so that the temple can be positioned for suitable and comfortable wearing by the wearer.

While only one embodiment of the invention has been shown and described in detail it will be understood that the same is for illustration purpose only and not to be taken as a definition of the invention, reference being has for this purpose to the appended claims.

What is claimed is:

1. A spectacle frame comprising a lens receiving body, two temples pivotally and adjustably connected to the opposite ends of said lens receiving body and an articulate connecting device for pivotally connecting between each end of said lens receiving body and each of said temples, characterized by that said articulate connecting device comprises a first half portion associated with said lens receiving body and a second half portion associated with said temple, said first half portion including a base plate integrally having spaced legs extending from one side of said base plate and embedded in said lens receiving body, spaced and opposite brackets extending from the other side of said base plate and a pivot pin extending between said brackets; and said second half portion including a washer member received in a recess in said temple and having at least one threaded through hole, an adjustable washer holding-down member for holding said washer member on said temple and having at least one elongated plain hole having the elongated dimension greater than the diameter of said threaded hole in the washer member and in communication with the threaded hole, said washer holding-down member further including a recess receiving said pivot pin therein, and threaded fastening means fastening the two members to said temple, said fastening means being in threaded engagement with said threaded hole in the washer member and adjustably extending through said plain hole in the holding-down member for permitting rotation and adjustment of the lens receiving body with respect to said temple.

2. The spectacle frame as set forth in claim 1, in which said washer member has two spaced threaded through holes and said adjustable washer holding-down member has two spaced plain holes in alignment with said two threaded holes in the washer member, respectively, one of said plain holes having a circular shape of diameter greater than that of its associated threaded hole and threaded fastening means and the other plain hole being said elongated plain hole and having an ellipsoidal shape with its longitudinal axis extending at right angles to the longitudinal axis of said washer holding-down member and also having a longitudinal dimension greater than the diameter of the associated threaded hole in the washer member and the associated fastening means and a transverse dimension substantially corresponding to the diameter of the associated threaded hole and fastening means.

* * * * *

UNITED STATES PATENT OFFICE
CERTIFICATE OF CORRECTION

Patent No. 4,018,516　　　　　　Dated April 19, 1977

Inventor(s) Hideaki Tohyama and Bonpei Gotoh

It is certified that error appears in the above-identified patent and that said Letters Patent are hereby corrected as shown below:

The name of the inventors should be Hideaki Tohyama and Bonpei Gotoh.

*Signed and Sealed this*

*fifth* Day of *July 1977*

[SEAL]

*Attest:*

RUTH C. MASON
*Attesting Officer*

C. MARSHALL DANN
*Commissioner of Patents and Trademarks*